(12) United States Patent
Bosse et al.

(10) Patent No.: US 11,787,419 B1
(45) Date of Patent: Oct. 17, 2023

(54) ROBUST NUMERICALLY STABLE KALMAN FILTER FOR AUTONOMOUS VEHICLES

(71) Applicant: Zoox, Inc., Foster City, CA (US)

(72) Inventors: Michael Carsten Bosse, Templeton, CA (US); Adrian Michael Costantino, Foster City, CA (US); Subhasis Das, Menlo Park, CA (US); Francesco Papi, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 167 days.

(21) Appl. No.: 17/508,811

(22) Filed: Oct. 22, 2021

(51) Int. Cl.
*B60W 50/00* (2006.01)
*B60W 60/00* (2020.01)
*B60W 40/105* (2012.01)

(52) U.S. Cl.
CPC ...... *B60W 50/0097* (2013.01); *B60W 60/001* (2020.02); *B60W 40/105* (2013.01); *B60W 2050/0024* (2013.01); *B60W 2050/0052* (2013.01); *B60W 2050/0083* (2013.01)

(58) Field of Classification Search
CPC .......... B60W 50/0097; B60W 60/001; B60W 40/105; B60W 2050/0024; B60W 2050/0052; B60W 2050/0083
See application file for complete search history.

(56) References Cited

U.S. PATENT DOCUMENTS

| | | | |
|---|---|---|---|
| 6,816,804 B1 * | 11/2004 | Lee | B60W 40/105 701/72 |
| 10,649,459 B2 | 5/2020 | Wang et al. | |
| 11,062,454 B1 | 7/2021 | Cohen et al. | |
| 2004/0024565 A1 * | 2/2004 | Yu | B60G 17/0182 702/151 |
| 2005/0182548 A1 * | 8/2005 | Bernzen | B60W 10/18 701/70 |
| 2015/0285614 A1 * | 10/2015 | Okada | B60W 50/0097 702/155 |

OTHER PUBLICATIONS

U.S. Appl. No. 16/866,839, filed May 5, 2020, Pradhan, et al., "Object Velocity Detection From Multi-Modal Sensor Data", 53 pages.

* cited by examiner

*Primary Examiner* — Ramsey Refai
(74) *Attorney, Agent, or Firm* — Lee & Hayes, P.C.

(57) ABSTRACT

The techniques discussed herein include modifying a Kalman filter to additionally include a loss component that dampens the effect measurements with large errors (or measurements indicating states that are rather different than the predicted state) have on the Kalman filter and, in particular, the updated uncertainty and/or updated prediction. In some examples, the techniques include scaling a Kalman gain based at least in part on a loss function that is based on the innovation determined by the Kalman filter. The techniques additionally or alternatively include a reformulation of a Kalman filter that ensures that the uncertainties determined by the Kalman filter remain symmetric and positive definite.

20 Claims, 4 Drawing Sheets

ROBUST NUMERICALLY STABLE KALMAN FILTER FOR AUTONOMOUS VEHICLES

BACKGROUND

Autonomous vehicles may use sensors to capture data regarding an environment through which the autonomous vehicles traverse. Autonomous vehicles use this sensor data to detect objects in the environment to avoid collisions. However, sensors are not perfectly accurate and/or precise all the time and may even output large measurement errors, at times, which can put systems that rely on the sensors at risk.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
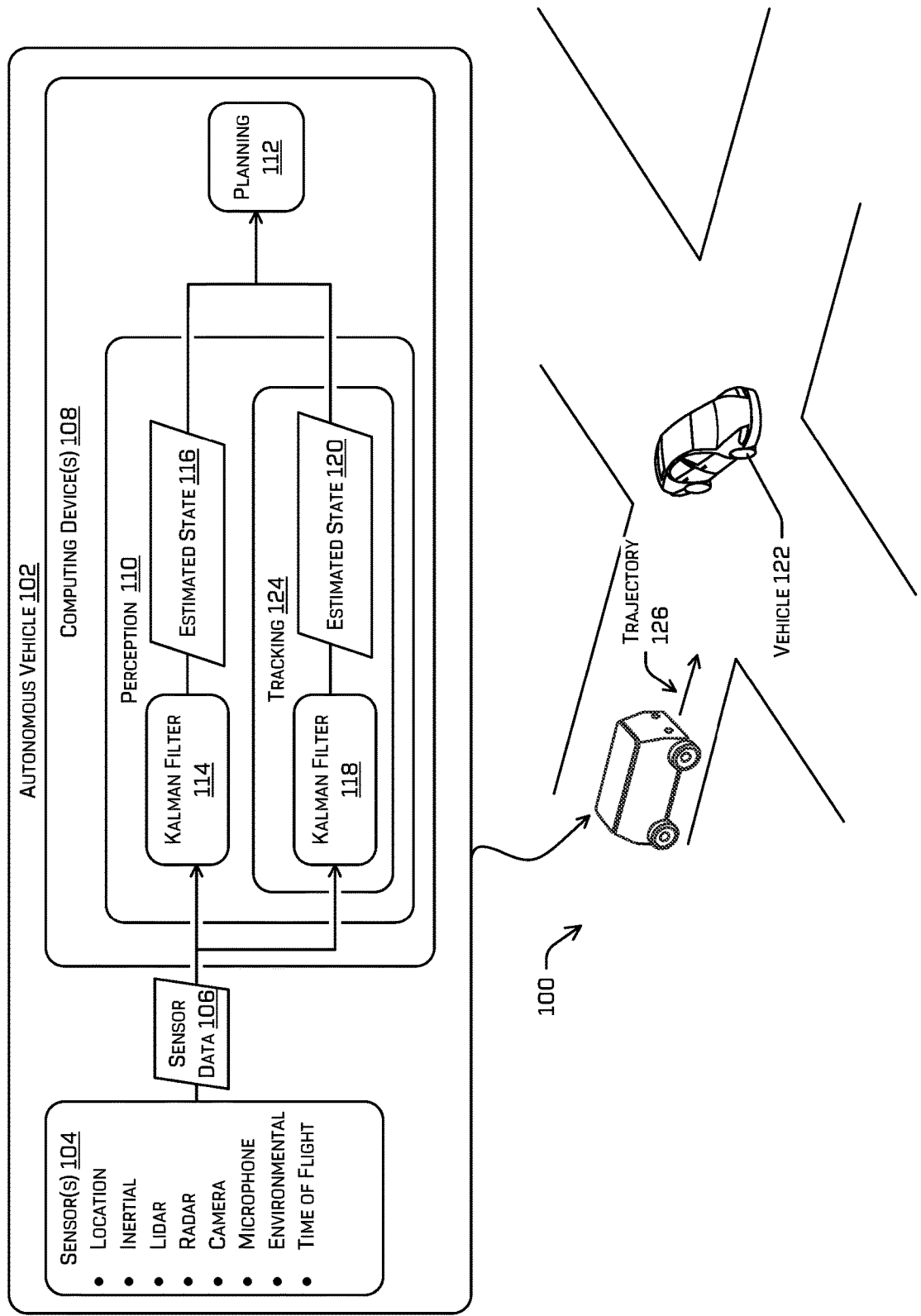
FIG. 1 illustrates an example scenario in which an autonomous vehicle uses two Kalman filters with robust error estimation for different operations on the vehicle. A first Kalman filter may use the techniques discussed herein to determine an estimated speed of the autonomous vehicle and a second Kalman filter may determine an estimated object position and/or velocity.

As discussed above, sensors may not always perform perfectly, due to limitations of sensor design, environmental interferences (e.g., cloud cover, solar glare, humid conditions, seismic activity), and/or adverse sensor conditions, such as overheating, broken parts, wear and tear, or the like. At times errors in sensor output may be extreme enough to negatively impact systems that rely thereon, such as an autonomous vehicle, which may include systems that use sensor data to determine what is in the environment surrounding the autonomous vehicle and how to navigate. This application relates to techniques for minimizing the impact of such errors. Examples described herein apply to Kalman filters, in particular.

A Kalman filter is a hardware and/or software system that can account for bounds of a sensor's ability to measure noise from the sensor and/or other variables in determining an estimated state based on a measurement output by the sensor. For example, the sensor could be a wheel speed sensor, which outputs a value indicative of a number of times a vehicle wheel has turned within a time period. The number of times measured may have an error associated with it due to inaccuracies and/or limitations of the wheel speed sensor, noise (e.g., various interference in the environment and/or in the sensor), etc. A Kalman filter can be designed to estimate an uncertainty associated with the measurement and use that estimated uncertainty to account for potential errors in the measurement. The Kalman filter then can determine an estimated state using the uncertainty, which may functionally result in an estimated state that is slightly different than the measurement would indicate. Returning to the wheel speed sensor example, the measurement might indicate a certain number of revolutions and it would be expected that the certain number of revolutions would result in a vehicle speed of 10 miles per hour, for example, but the Kalman filter's estimate of the vehicle speed may be 9.8 miles per hour after accounting for the uncertainty associated with the measurement.

A Kalman filter's estimate of the uncertainty associated with a measurement can be based on predicting a next state of the system and determining how good the prediction was using a next measurement once it is received. For controlled systems, such as a wheel that is being controlled by an autonomous vehicle system, the Kalman filter may factor in the controls. Returning to the wheel encoder example, the Kalman filter may predict a vehicle speed at a next time step (e.g., 0.1 seconds in the future, 0.2 seconds in the future, 0.5 seconds in the future, 1 second in the future), based on the current uncertainties associated with the currently estimated vehicle speed. A measurement may come in at that next time step and the Kalman filter may determine how closely the predicted vehicle speed matches the vehicle speed that the measurement seems to indicate. The Kalman filter can use the difference between the predicted vehicle speed and the measured vehicle speed (i.e., the vehicle speed that the measurement seems to indicate) to update the uncertainty associated with the sensor. The larger the difference between the prediction and the actual state, the greater the uncertainty.

If the measurement includes a large amount of error, the difference between the prediction and the state the measurement seems to indicate will also be large and the updated uncertainty that the Kalman filter determines will also grow. This increase in uncertainty can destabilize the system and cause the estimated states output by the Kalman filter to be less accurate and/or precise.

The techniques discussed herein include modifying the Kalman filter to additionally include a loss component that dampens the effect measurements with large errors (or measurements indicating states that are rather different than the predicted state) have on the Kalman filter and, in particular, the updated uncertainty and/or updated prediction. In technical terms, the loss component scales the Kalman gain based at least in part on a Cauchy (or other similar) loss that is determined based at least in part on the innovation—a value that is based on the difference between the measurement and the predicted measurement.

The techniques additionally or alternatively include a reformulation of a Kalman filter that ensures that the uncertainties determined by the Kalman filter remain symmetric and positive definite. In particular, this protects the Kalman filter from non-symmetric covariance matrices caused by rounding errors made by the device that executes the Kalman filter and therefore potentially non-positive matrix entries in the Kalman filter, leading to an unsolvable state. The reformulation may include determining the innovation covariance and the predicted covariance using a matrix factorization (e.g., Cholesky decomposition, eigen decomposition) of the uncertainty, as discussed in more detail herein.

The techniques discussed herein may improve the accuracy and/or precision of a Kalman filter, protect accuracy of the Kalman filter from perturbations in sensor output, and may prevent the Kalman filter from reaching an unsolvable state, which may cause the Kalman filter to fail to generate an output, freeze, or for the Kalman filter output to drift.

Additionally, the techniques may improve the safety and/or efficacy of an autonomous vehicle. For example, the techniques discussed herein may allow the autonomous vehicle to determine its own speed more accurately, track other objects more accurately (such as by determining a position and/or velocity of an object more accurately), and/or predict other objects' future actions more accurately (such as by predicting a future position and/or future velocity of an object more accurately).

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic and/or sonar sensor, and/or other depth-sensing sensor), an image sensor (e.g., a camera), an audio sensor (e.g., a microphone), and/or environmental sensor (e.g., a barometer, a hygrometer, etc.).

In at least one example, a sensor may generate sensor data 106 in association with a time, which may be referred to herein as a time step—a reference to a discrete point in time that is indexed by time steps. Sensor data may be generated at intervals between time steps, such as 5 milliseconds, 10 milliseconds, 20 milliseconds, 100 milliseconds, 250 milliseconds, 0.5 seconds, 1 second, 2 seconds, 5 seconds, or any other time interval. In some examples, the frequency of the time steps may be based at least in part on sensor output, a digital signal processing component, and/or a computing and/or time-keeping component of the vehicle 102. Each time step of sensor data may include a measurement that will depend on the sensor type. For example, radar, sonar, and/or lidar sensors may output a time between a signal emission and a return; an accelerometer may output a In some examples, the autonomous vehicle 102 may include computing device(s) 108 that may include a perception component 110 and/or a planning component 112, all or some of which may receive sensor data 106 from sensor(s) 104. The sensor(s) 104 may generate sensor data, which may be received by computing device(s) 108. However, in other examples, some or all of the sensor(s) 104 and/or computing device(s) 108 may be separate from and/or disposed remotely from the vehicle 102 and data capture, processing, commands, and/or controls may be communicated to/from the vehicle 102 by one or more remote computing devices via wired and/or wireless networks.

In general, the perception component 110 may determine what is in the environment surrounding the autonomous vehicle 102 and the planning component 112 may determine how to operate the autonomous vehicle 102 according to information received from the perception component 110 regarding the environment. The perception component 110 may include one or more ML models and/or other computer-executable instructions for detecting, identifying, segmenting, classifying, and/or tracking objects from sensor data collected from the environment of the autonomous vehicle 102.

Although a Kalman filter may be used in any of a number of different components of the autonomous vehicle in addition to or instead of the perception component 110 and/or the planning component 112, for the sake of brevity the function of two Kalman filters are discussed in regard to FIG. 1 as part of the perception component 110.

A first Kalman filter 114 may receive a first type of sensor data from the sensor(s) 104. For example, the first Kalman filter 114 may receive wheel encoder signals indicating a number of times that a motor associated with a wheel has rotated, a float value representing a torque from a torque sensor, or the like. Using the techniques discussed herein, the Kalman filter 114 may determine an estimated state 116 based on a measurement indicated in the sensor data. The particular Kalman filter 114 in this instance may determine a vehicle speed as the estimated state 116 using wheel encoder and/or torque sensor measurements. In other words, the measurement in such a case may be a number of times a wheel turned and the estimated state 116 may be a vehicle speed.

To give another example, a second Kalman filter 118 may receive a second type of sensor data from the sensor(s) 104. Such sensor data may include an image, lidar and/or radar data, or the like (i.e., raw sensor data), and/or perception data generation by the perception component, such as an object detection, region of interest (ROI) (e.g., a bounding box, a mask), semantic segmentation, instance segmentation, point cloud segmentation, and/or the like, as discussed in more detail in U.S. patent application Ser. No. 16/386,249, filed Apr. 16, 2019, the entirety of which is incorporated herein by reference for all purposes; and U.S. patent application Ser. No. 16/866,839, filed May 5, 2020, the entirety of which is incorporated herein by reference for all purposes. The Kalman filter 118 may use such data to determine an estimated state 120 that indicates a predicted position, heading, velocity, acceleration, or the like of a detected object, such as vehicle 122. In some examples, the prediction may be indicated in a sensor space (e.g., the estimated state may indicate an estimated position of an object within a camera frame) and/or the prediction may be indicated in coordinates associated with a representation of the real-world. In an additional or alternate example, the estimated state 120 determined by the Kalman filter 118 may indicate a current position, heading, velocity, acceleration, or the like of a detected object. Regardless, the current and/or predicted state associated with a detected object may be used by a tracking component 124 that creates, maintains, and/or retires tracks associated with objects.

The tracking component 124 may receive one or more environment representations and/or object detections from respective perception pipelines (e.g., vision pipeline, lidar pipeline, hybrid vision-lidar pipeline, radar pipeline, hybrid vision-lidar-radar pipeline, and/or the like) and determine whether or not to associate a formerly generated track with a current object detection or to generate a new track in association with a current object detection. The tracking component 124 may additionally or alternatively determine a final environment representation and/or an estimated object detection that may act as a summary of the different object detections. The tracking component 124 may use the estimated state 120 to determine whether or not to associate an object detection with a track. For example, the tracking component 124 may use the predicted position and/or heading and/or the Kalman filter's estimate of the current position of the detected object to determine whether such data corresponds with a track indicating previous positions, headings, etc. of a detected object. For example, the tracking component 124 may determine whether a previously predicted position/heading predicted by the Kalman filter 118 corresponds with a current position/heading output by the Kalman filter 118.

Ultimately, the tracking component 124 may output a track in association with a detected object, such as vehicle 122. In some examples, the track may associate a current object detection with one or more previous object detections and/or may indicate data related thereto, such as a velocity, acceleration, heading, object classification, unique identifier, occlusion status (e.g., whether the object is currently/previously occluded partially or totally from one or more sensors). In another example where the track is determined to be associated with an object that has newly been detected, the current object detection may be the only object detection associated with the track.

The planning component 112 may use the perception data received from perception component 110, such as estimated state 116, estimated state 120, and/or a track from the tracking component 124, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; generate, substantially simultaneously and based at least in part on the perception data and/or simulated perception data (which may further include predictions regarding detected objects in such data), a plurality of potential trajectories for controlling motion of the vehicle 102 in accordance with a receding horizon technique (e.g., 1 micro-second, 100 milliseconds, half a second, 6 seconds, any other number) to control the vehicle to traverse the route (e.g., in order to avoid any of the detected objects); and select one of the potential trajectories as a trajectory 126 that may be used to generate a drive control signal that may be transmitted to drive components of the vehicle 102. FIG. 1 depicts an example of such a trajectory 126, represented as an arrow indicating a heading, velocity, and/or acceleration, although the trajectory itself may comprise instructions for controller(s) of the vehicle 102, which may, in turn, actuate a drive system of the vehicle 102.

Example System

Figure 2:
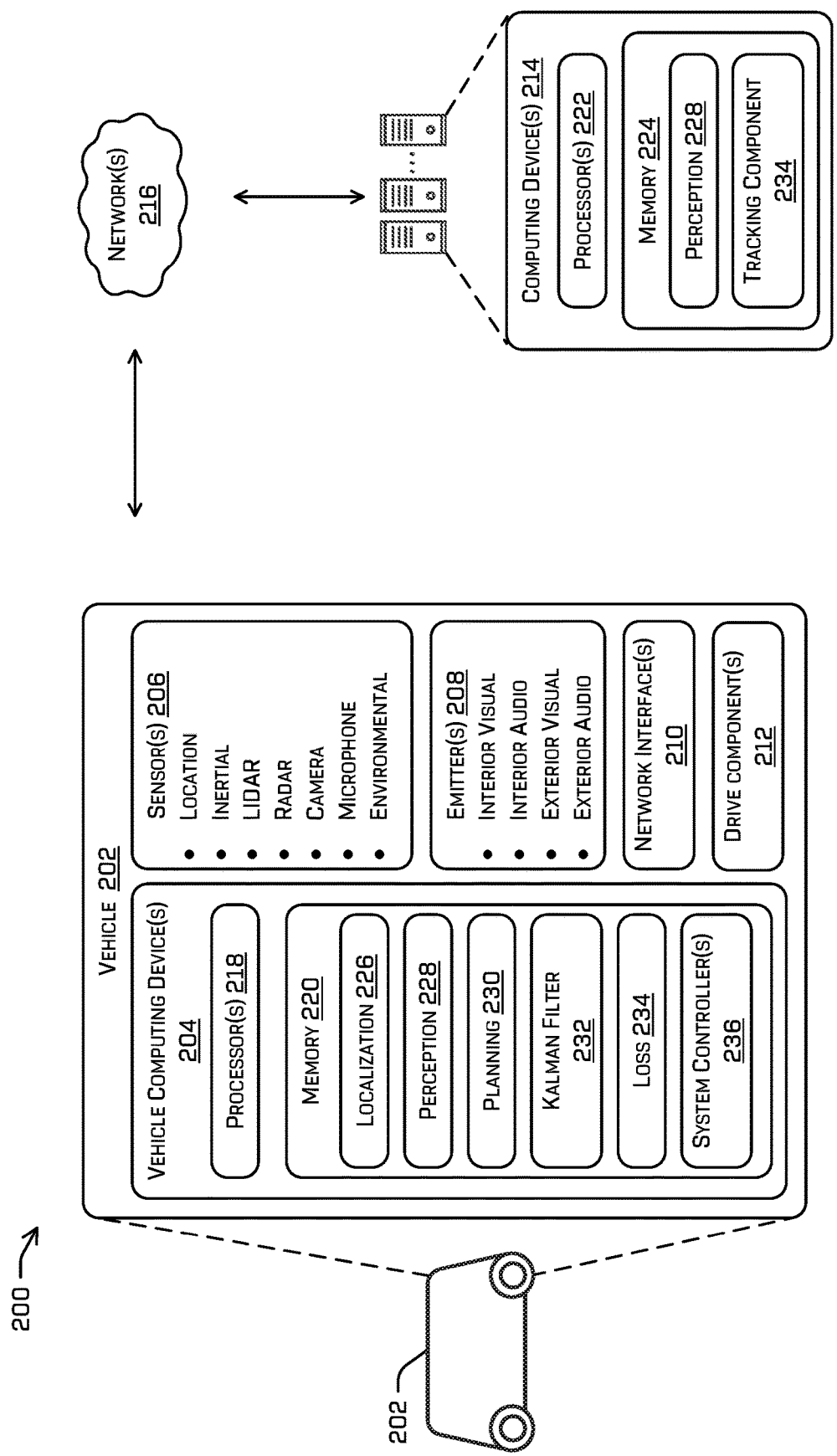
FIG. 2 illustrates a block diagram of an example system comprising a Kalman filter and/or loss component for robust error estimation.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 108 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface (s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, Kalman filter 232, loss component 234, and/or system controller(s) 236. Perception component 228 may represent perception component 110, planning component 230 may represent planning component 112, and/or Kalman filter 232 may represent Kalman filter 114 and/or 118. The memory 220 may additionally or alternatively comprise map(s), which are unillustrated.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the tracking component 234, a location and/or orientation of the vehicle 202 relative to the environment and/or sensor data associated therewith.

In some instances, perception component 228 may comprise a primary perception system and/or a prediction system implemented in hardware and/or software. The perception component 228 may comprise one or more perception pipelines that may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 236 and/or drive component(s) 212 may parse/cause to be carried out, second instructions for the emitter(s) 208 may be formatted according to a second format associated therewith).

Any of the components discussed, including any component associated with a sensor and/or that generates data based on a sensor, such as localization component 226, perception component 228, planning component 230, and/or system controller(s) 236 may comprise a Kalman filter 232 and/or loss component 234 that functions as described herein. In some examples, the loss component may be part of the Kalman filter 232, although it's depicted separately since the loss component 234 is a n extra component compared to extant Kalman filters. In some examples, the Kalman filter 232 may include a simple Kalman filter, a Kalman-Bucy filter, an extended Kalman filter (EKF), and/or the like. The Kalman filter 232 and/or the loss component 234 may be implemented in hardware, software, and/or a combination thereof (e.g., a field-programmable gate array (FPGA) or the like). The loss component 234 may include a Cauchy function, although other functions are contemplated, such as a "Fair" function, Geman-McClure function, Welsch function, or Huber function.

The memory 220 and/or 224 may additionally or alternatively store a mapping system (e.g., generating a map based at least in part on sensor data), a planning system, a ride management system, etc. Although localization component 226, perception component 228, planning component 230, Kalman filter 232, loss component 234, and/or system controller(s) 236 are illustrated as being stored in memory 220, any of these components may include processor-executable instructions, machine-learned model(s) (e.g., a neural network), and/or hardware and all or part of any of these components may be stored on memory 224 or configured as part of computing device(s) 214.

As described herein, the localization component 226, the perception component 228, the planning component 230, and/or other components of the system 200 may comprise one or more ML models. For example, the localization component 226, the perception component 228 and/or the planning component 230 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 236, which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202. For example, the planning component 230 may generate instructions based at least in part on perception data generated by the perception component 228, and may validate and the perception data/or transmit the instructions to the system controller(s) 236. The system controller(s) 236 may control operation of the vehicle 202 based at least in part on the instructions received from the planning component 230.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Kalman Filter and Loss Function

Figure 3:
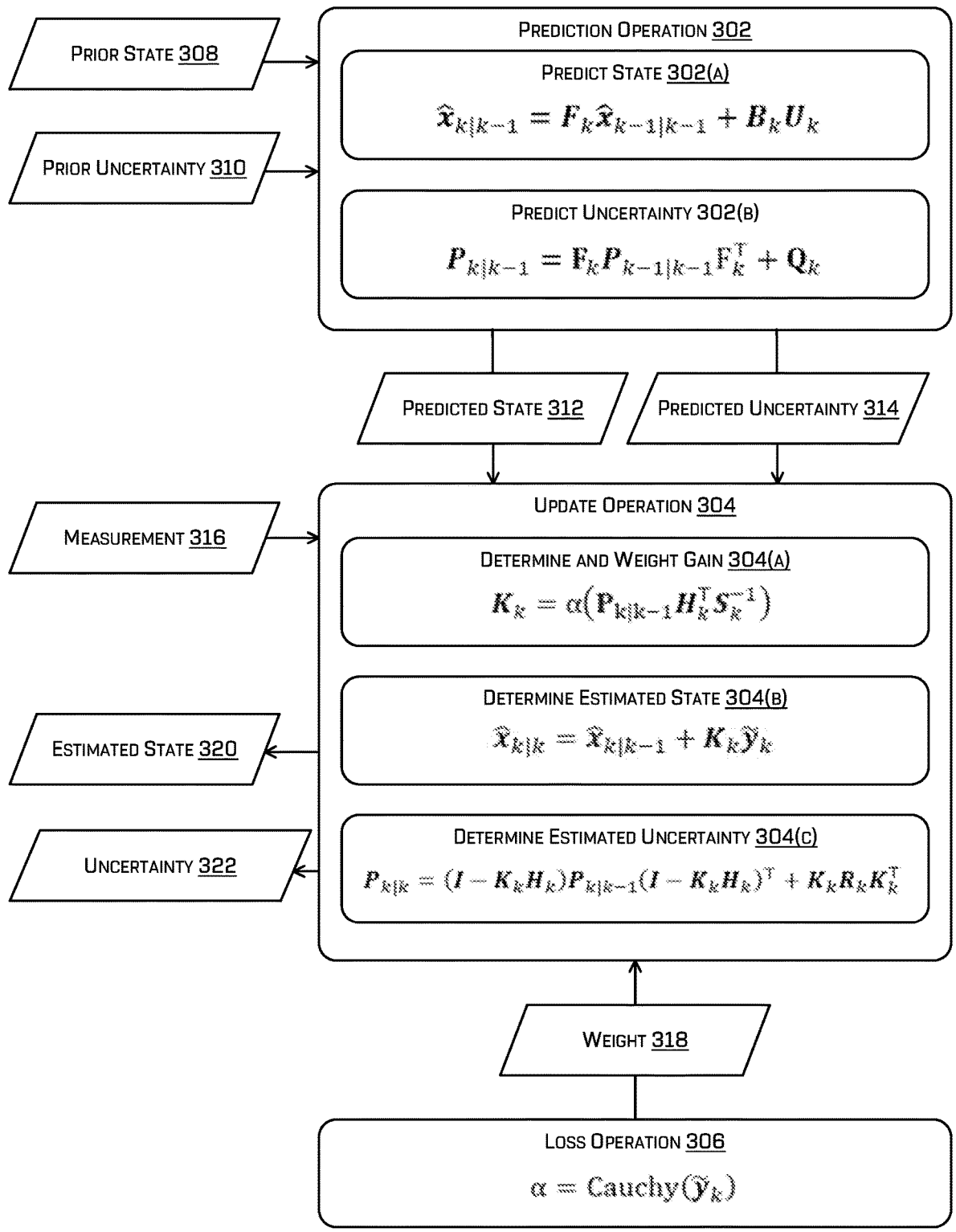
FIG. 3 illustrates a block diagram of a Kalman filter's operations augmented by a loss component.

FIG. 3 illustrates a block diagram of a Kalman filter's operations augmented by a loss component. The Kalman filter may comprise hardware and/or software for accomplishing a prediction operation 302, an update operation 304, and a loss operation 306. The loss operation 306 may be accomplished by a separate loss component, in some examples.

The Kalman filter may receive a prior state 308, $\hat{x}_{k-1|k-1}$, and/or prior uncertainty 310, $P_{k-1|k-1}$. If this if the first time step, no such priors may exist, so an initialization state and/or initialization uncertainty may be used. Such initialization values may be based at least in part on the sensor data received and/or stored values retrieved by the Kalman filter. In some examples, the predicted state may be matrix, meaning that the estimated state may be multi-dimensional and/or multiple states may be determined. In very simple examples, the state may be a single value. In some examples, the uncertainty may be a single value or a matrix when the state is also a matrix. The uncertainty may include a covariance.

At operation 302(a), the Kalman filter may determine a predicted state 312, according to:

$$\hat{x}_{k|k-1} = F_k \hat{x}_{k-1|k-1} + B_k U_k \quad (1)$$

where k is the k-th time tick, F is a state transition matrix, U is a control/input variable (if any, depending on what system is being monitored) (i.e., a measurable (deterministic) input to the system, such as steering commands, applied torque) B is a control/input transition matrix mapping control to state variables. In some examples, F may be a model of a linear or nonlinear dynamic system. In other words, the Kalman filter uses a model of the system to predict, using a previous state of the system and/or any controls provided to the system (if the system is a controlled system) to predict a next state of the system.

At operation 302(b), the Kalman filter may determine a measure of uncertainty associated with the predicted state, i.e., the predicted uncertainty 314, $P_{k|k-1}$. This measure of uncertainty may be a covariance matrix associated with the predict state given by:

$$P_{k|k-1} = F_k P_{k-1|k-1} F_k^T + Q_k \quad (2)$$

where Q is a process noise matrix that may be independent or dependent on the state variables, depending on the type of system being monitored. Q may be given by $Q_k = E(w_k w_k^T)$ where E is the expected value and w is the process noise vector. The process noise matrix may, itself, include covariances associated with noise of the process.

At operation 304, the Kalman filter may receive a measurement 316, z, from a sensor. Note that the state, x, may be determined from/relates to the measurement by some transfer function, H, called an observation or observation matrix. Operation 304 is called an update operation and includes determining an estimate of the current state, based on the known past estimation and the present estimation, and updating the uncertainty matrix to reflect how closely the prediction and the present estimation correspond. According to the techniques discussed herein, the Kalman gain may be weighted according to a loss function to tune how much a measurement, and particularly outlier measurements, affect the estimated state and/or changes to the uncertainty. In instances where the measurement is associated with a state that is very different than the predicted state, the greater the difference, the closer to the loss function causes the estimated state to be to the predicted state. In other words, as the difference approaches infinity, the estimated state approaches the predicted state and the uncertainty approaches the predicted uncertainty. This functionally causes the Kalman filter's estimated state and uncertainty to be dependent upon the measurements and results in soft outlier rejection. The details are discussed in more detail below.

At operation 304(a), the Kalman filter determines a weighted gain (a weighted Kalman gain), $K_k^*$, according to:

$$K_k^* = \alpha (P_{k|k-1} H_k^T S_k^{-1}) \quad (3)$$

where $\alpha$ is the weight 318 determined by the loss component and S is the innovation covariance (i.e., the pre-fit residual covariance), which is given by:

$$S_k = H_k P_{k|k-1} H_k^T + R_k \quad (4)$$

where R is the measurement noise, which may be uncertainty associated with the sensor itself and may be given by $R_k = E(v_k v_k^T)$ wherein v is the measurement noise vector. The weight 318 may be determine by the loss component at operation 306 and may be determined using a Cauchy function, in the depicted example, although other functions are contemplated (e.g., a "Fair" function, Geman-McClure function, Welsch function, Huber function). For example, at operation 306, the weight 318 may be determined based at least in part on the innovation, as given below:

$$\alpha = \text{Cauchy}(\tilde{y}_k) \quad (5)$$

where the innovation (i.e., the pre-fit residual) is given by:

$$\tilde{y}_k = z_k - H_k \hat{x}_{k|k-1} \quad (6)$$

where z is the measurement.

Note that determining the further includes tuning the Kalman gain separately from the weight to minimize the estimate variance, $P_{k|k}$. In some examples, the weight may be applied to the Kalman gain after such tuning has been accomplished.

The weighted Kalman gain may then be used to determine the estimate of the current state, estimated state 320, and the measure of uncertainty of the estimation, uncertainty 322. At operation 304(b), the estimated state 320 may be determined according to:

$$\hat{x}_{k|k} = \hat{x}_{k|k-1} + K_k^* \tilde{y}_k \quad (7)$$

At operation 304(c), the uncertainty associated with the estimated state may be determined according to:

$$P_{k|k} = (I - K_k^* H_k) P_{k|k-1} (I - K_k^* H_k)^T + K_k^* R_k K_k^{*T} \quad (8)$$

where I is the identity matrix.

According to the techniques discussed herein, two modifications may be made to the Kalman filter to ensure that the Kalman filter will remain symmetrical and positive definite despite rounding errors made by a computing device. These two changes include substituting equation (2) with equation (9), equation (4) with equation (10), and equation (8) with equation (11). Equations (9)-(11) replace portions of the Joseph form of the Kalman filter that use squares with squared decompositions as follows:

$$P_{k|k-1} = F_k P_{k-1|k-1} F_k^T + Q_k = A_{k-1} A_{k-1}^T + Q_k \qquad (9)$$

where $A_{k-1} = F_k L_{P_{k-1|k-1}}$ and $A_{k-1}^T = L_{P_{k-1|k-1}} L_{P_{k-1|k-1}}^T$ and L is a real lower triangular matrix with positive diagonal entries such that $P_{P_{k-1|k-1}} = L_{P_{k-1|k-1}} L_{P_{k-1|k-1}}^T$;

$$S_k = H_k P_{k-1|k-1} H_k^T + R_k = HL_{P_{k|k-1}} (HL_{P_{k|k-1}})^T + R_k \qquad (10)$$

where L is a real lower triangular matrix with positive diagonal entries such that $P_{k|k-1} = L_{P_{k|k-1}} L_{P_{k|k-1}}^T$; and $$P_{k|k} = (I - K_k * H_k) P_{k|k-1} (I - K_k * H_k)^T + K_k * R_k K^*_k{}^T = (I - K^*_k H_k) L_{P_{k|k}} ((I - K_k * H_k) L_{P_{k|k-1}})^T + K_k * L_{R_k} (K_k * L_{R_k})^T \qquad (11)$$

where $R_k = L_{R_k} L_{R_k}^T$. In some examples, the decomposition may include a Cholesky decomposition, eigen decomposition, rank factorization, QR decomposition, LU decomposition, Jordan decomposition, and/or the like.

Example Process

Figure 4:
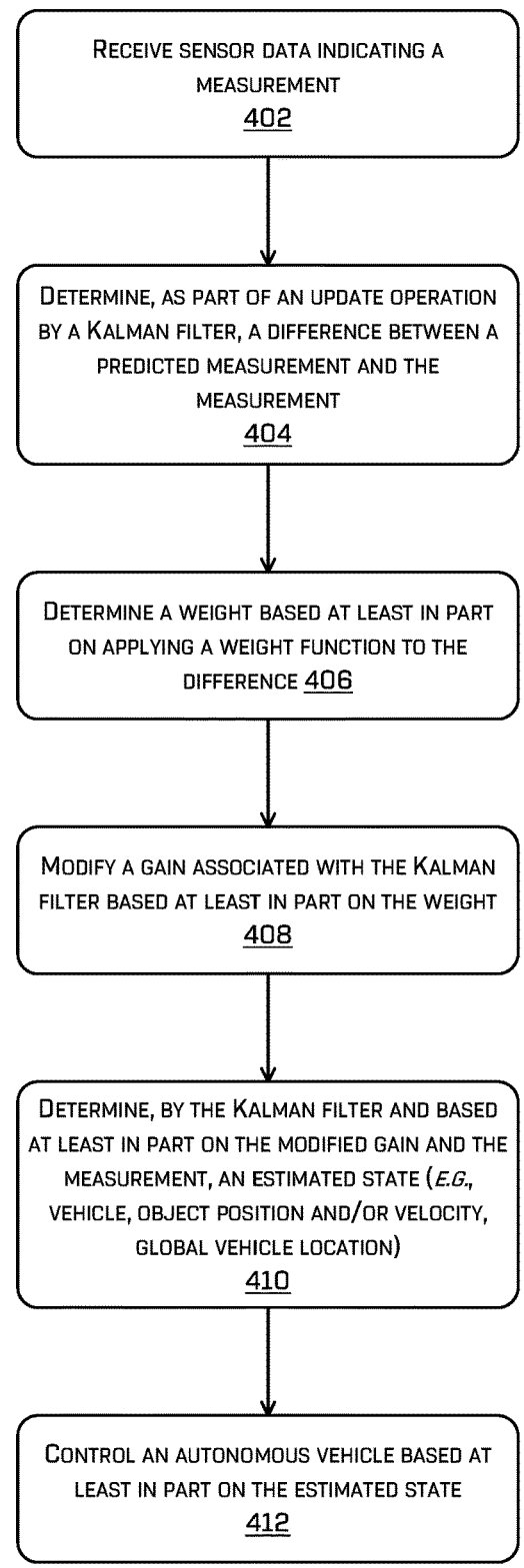
FIG. 4 illustrates a flow diagram of an example process for determining an estimated state using a Kalman filter and loss component.

FIG. 4 illustrates a flow diagram of an example process for determining an estimated state using a Kalman filter and loss component. Depending on what the Kalman filter is being used for, various components of the autonomous vehicle may conduct example process 400, such as the perception component, a tracking and/or prediction component of the perception component, a raw sensor data processor (e.g., a wheel encoder processor, a GPS processor), a planning component, a localization component, and/or the like. Ultimately, the Kalman filter and/or a loss component may accomplish operations 402-410.

At operation 402, example process 400 may comprise receiving sensor data indicating a measurement, according to any of the techniques discussed herein. As discussed above, the sensor data and measurement will depend on the component in which the Kalman filter is located. For example, the measurement may be a number of rotations of a motor or a wheel, three or four float values received from an accelerometer, perception data associated with an image and/or lidar data, etc.

At operation 404, example process 400 may comprise determining, as part of an update operation by a Kalman filter, a difference between a predicted measurement and the measurement, according to any of the techniques discussed herein. In at least one example, operation 404 may include determining an innovation, the pre-/during fit residual ($\tilde{y}_k = z_k - H_k \hat{x}_{k|k-1}$).

At operation 406, example process 400 may comprise determining a weight based at least in part on applying a loss function to the difference, according to any of the techniques discussed herein. Operation 406 may comprise determining a weight using a Cauchy function, Huber function, "Fair" function, Geman-McClure function, Welsch function, an asymmetric function, a machine-learned function, or the like. In some examples, the innovation may be normalized before the weight is determined. For example, the innovation may be normalized by evaluating the squared whitening of the innovation—dividing the innovation by the inverse of the innovation covariance. Once those scalars have been determined, they may be evaluated using the loss function. For example, if a Cauchy function is used, the weight may be determined based at least in part on the following weight function:

$$\rho' = \frac{1}{1 + \frac{\overline{y_k^2}}{\gamma}} \qquad (12)$$

which may be derived from the Cauchy loss function $\rho(z) = \ln(1+z)?$. Note that $\overline{y_k^2}$ may symbolize a normalized value of $y_k$, such as a squared whitening of $y_k$ and $\gamma$ may be the Cauchy threshold. For example, the squared whitened innovation may be given by $\overline{y_k^2} = \tilde{y}_k S_K^{-1} \tilde{y}_k^T$.

In examples where a Cauchy function is used, the parameter, $\gamma$ (a threshold/scale), of the Cauchy function, may be set based at least in part on a condition that the vehicle detects based at least in part on sensor data. Other loss functions may have a threshold (alternately called a scale in some cases) and/or other parameters that may be tuned based at least in part on determining a condition from sensor data, map data, perception data, and/or the like. For example, detecting the condition may include determining, based at least in part on sensor data, map data, and/or the like, that the autonomous vehicle is on a highway (in which case the threshold may be increased, since the measurements may be noisier), a number and/or speed of dynamic objects around the autonomous vehicle, whether a track associated with an object was newly created (in which case the threshold may be increased), and/or the like. Any of these and other variables like these may be encoded and used to dynamically determine the threshold to account for context that may increase the noise associated with the measurement(s).

At operation 408, example process 400 may comprise modifying a gain associated with the Kalman filter based at least in part on the weight, according to any of the techniques discussed herein. For example, the weight determined by the loss component may scale the Kalman filter, such that as the innovation goes to infinity, the weight goes to zero (and therefore the Kalman gain goes to zero), causing the Kalman filter to be unchanged, meaning the estimated state would equal the predicted state and the uncertainty associated with the estimated state would equal the predicted covariance. Whereas, as the innovation approaches zero the weight approaches to one where the Kalman gain would remain the same. Note that the Kalman gain may be determined separately as part of an optimization problem that determines the Kalman gain that minimizes the estimate variance, $P_{k|k}$.

At operation 410, example process 400 may comprise determining, by the Kalman filter and based at least in part on the modified gain and the measurement, an estimated state (and/or uncertainty associated therewith), according to any of the techniques discussed herein. Such an estimated state may be determined according to equation (7) and an uncertainty associated therewith may be determined according to equation (8).

At operation 412, example process 400 may comprise controlling an autonomous vehicle based at least in part on the estimated state and/or the uncertainty, according to any of the techniques discussed herein. For example, the localization component may use an estimated state indicating an estimated vehicle speed to determine where the vehicle is in an environment, the planning component may use a vehicle speed and/or tracks associated with detected objects to plan a route and/or generate a trajectory for controlling the vehicle, etc.

EXAMPLE CLAUSES

A: A method comprising: receiving sensor data indicating a first measurement; determining, as part of an update operation by a Kalman filter, a difference between the first measurement and a predicted measurement; determining a weight based at least in part on applying a weight function to the difference; modifying a gain associated with the Kalman filter based at least in part on the weight; determining, by the Kalman filter and based at least in part on the modified gain and the first measurement, an estimated state; and controlling an autonomous vehicle based at least in part on the estimated state.

B: The method of paragraph A, wherein determining the weight comprises: normalizing, as a normalized difference, the difference between the predicted measurement and the first measurement; and determining a division of 1 by the sum of 1 and a square of the normalized difference divided by a squared Cauchy threshold.

C: The method of paragraph A or B, wherein applying the weight function is a separate operation from the update operation and operations of the Kalman filter.

D: The method of any one of paragraphs A-C, wherein the weight function comprises a parameter and the method further comprises: determining, based at least in part on the sensor data, a condition; and determining the parameter based at least in part on the condition.

E: The method of paragraph D, wherein the parameter includes a squared threshold.

F: The method of any one of paragraphs A-E, wherein at least one of: the update operation comprises updating a covariance matrix based at least in part on determining a first product of an observation matrix by a decomposition of a first uncertainty matrix associated with the estimated state and determining a second product of the first product by a transpose of the first product; or the method further comprises a prediction operation, the prediction operation comprising determining a predicted covariance matrix based at least in part on determining a third product of the gain by a decomposition of a second uncertainty matrix associated with process noise and determining a fourth product of the third product by a transpose of the third product.

G: A system comprising: one or more processors; and a memory storing processor-executable instructions that, when executed by the one or more processors, cause the system to perform operations comprising: receiving sensor data indicating a first measurement; determining a difference between the first measurement and a predicted measurement; determining a weight based at least in part on the difference; modifying a Kalman filter based at least in part on the weight; determining, by the Kalman filter and based at least in part on the modification and the first measurement, an estimated state; and controlling an autonomous vehicle based at least in part on the estimated state.

H: The system of paragraph G, wherein determining the weight comprises: normalizing, as a normalized difference, the difference between the predicted measurement and the first measurement; and determining a division of 1 by the sum of 1 and a square of the normalized difference divided by a squared Cauchy threshold.

I: The system of paragraph G or H, wherein: determining the difference comprises applying a weight function to the difference, and applying the weight function is a separate operation from an update operation and operations of the Kalman filter.

J: The system of any one of paragraphs G-I, wherein the weight function comprises a parameter and the operations further comprise: determining, based at least in part on the sensor data, a condition; and determining the parameter based at least in part on the condition.

K: The system of paragraph G, wherein modifying the Kalman filter comprises modifying a Kalman gain and modifying the Kalman filter comprises scaling the Kalman gain by the weight.

L: The system of any one of paragraphs G-K, wherein: modifying the Kalman filter comprises modifying a gain of the Kalman filter; modifying the gain based at least in part on the weight, the weight having a first value below a lower threshold, results in the first measurement being ignored or influencing a covariance matrix of the Kalman filter less; or modifying the gain based at least in part on the weight, the weight having a second value that meets or exceeds an upper threshold, results in the first measurement being used to modify a covariance matrix of the Kalman filter.

M: The system of any one of paragraphs G-L, wherein at least one of: an update operation of the Kalman filter comprises updating a covariance matrix based at least in part on determining a first product of an observation matrix by a decomposition of a first uncertainty matrix associated with the estimated state and determining a second product of the first product by a transpose of the first product; or the operations further comprises a prediction operation of the Kalman filter, the prediction operation comprising determining a predicted covariance matrix based at least in part on determining a third product of a gain of the Kalman filter by a decomposition of a second uncertainty matrix associated with process noise and determining a fourth product of the third product by a transpose of the third product.

N: A non-transitory computer-readable medium storing processor-executable instructions that, when executed by one or more processors, cause the one or more processors to perform operations comprising: receiving sensor data indicating a first measurement; determining a difference between the first measurement and a predicted measurement; determining a weight based at least in part on the difference; modifying a Kalman filter based at least in part on the weight; determining, by the Kalman filter and based at least in part on the modification and the first measurement, an estimated state; and controlling an autonomous vehicle based at least in part on the estimated state.

O: The non-transitory computer-readable medium of paragraph N, wherein determining the weight comprises: normalizing, as a normalized difference, the difference between the predicted measurement and the first measurement; and determining a division of 1 by the sum of 1 and a square of the normalized difference divided by a squared Cauchy threshold.

P: The non-transitory computer-readable medium of paragraph O, wherein: determining the weight comprises applying a weight function to the difference; the weight function comprises a parameter; and the operations further comprise: determining, based at least in part on the sensor data, a condition; and determining the parameter based at least in part on the condition.

Q: The non-transitory computer-readable medium of any one of paragraphs N-P, wherein the parameter includes a squared threshold.

R: The non-transitory computer-readable medium of any one of paragraphs N-Q, wherein modifying the Kalman filter comprises modifying a Kalman gain and modifying the Kalman filter comprises scaling the Kalman gain by the weight.

S: The non-transitory computer-readable medium of any one of paragraphs N-R, wherein: modifying the Kalman filter comprises modifying a gain of the Kalman filter; modifying the gain based at least in part on the weight, the weight having a first value below a lower threshold, results in the first measurement being ignored or influencing a covariance matrix of the Kalman filter less; or modifying the gain based at least in part on the weight, the weight having a second value that meets or exceeds an upper threshold, results in the first measurement being used to modify a covariance matrix of the Kalman filter.

T: The non-transitory computer-readable medium of any one of paragraphs N-S, wherein at least one of: an update operation of the Kalman filter comprises updating a covariance matrix based at least in part on determining a first product of an observation matrix by a decomposition of a first uncertainty matrix associated with the estimated state and determining a second product of the first product by a transpose of the first product; or the operations further comprises a prediction operation of the Kalman filter, the prediction operation comprising determining a predicted covariance matrix based at least in part on determining a third product of a Kalman gain by a decomposition of a second uncertainty matrix associated with process noise and determining a fourth product of the third product by a transpose of the third product.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving sensor data indicating a first measurement;
   determining, as part of an update operation by a Kalman filter, a difference between the first measurement and a predicted measurement;
   determining a weight based at least in part on applying a weight function to the difference;
   modifying a gain associated with the Kalman filter based at least in part on the weight;
   determining, by the Kalman filter and based at least in part on the modified gain and the first measurement, an estimated state; and
   controlling an autonomous vehicle based at least in part on the estimated state.

2. The method of claim 1, wherein determining the weight comprises:
   normalizing, as a normalized difference, the difference between the predicted measurement and the first measurement; and
   determining a division of 1 by the sum of 1 and a square of the normalized difference divided by a squared Cauchy threshold.

3. The method of claim 1, wherein applying the weight function is a separate operation from the update operation and operations of the Kalman filter.

4. The method of claim 1, wherein the weight function comprises a parameter and the method further comprises:

determining, based at least in part on the sensor data, a condition; and determining the parameter based at least in part on the condition.

5. The method of claim 4, wherein the parameter includes a squared threshold.

6. The method of claim 1, wherein at least one of:

the update operation comprises updating a covariance matrix based at least in part on determining a first product of an observation matrix by a decomposition of a first uncertainty matrix associated with the estimated state and determining a second product of the first product by a transpose of the first product; or the method further comprises a prediction operation, the prediction operation comprising determining a predicted covariance matrix based at least in part on determining a third product of the gain by a decomposition of a second uncertainty matrix associated with process noise and determining a fourth product of the third product by a transpose of the third product.

7. A system comprising:

one or more processors; and a memory storing processor-executable instructions that, when executed by the one or more processors, cause the system to perform operations comprising:

receiving sensor data indicating a first measurement;

determining a difference between the first measurement and a predicted measurement;

determining a weight based at least in part on the difference;

modifying a Kalman filter based at least in part on the weight;

determining, by the Kalman filter and based at least in part on the modification and the first measurement, an estimated state; and controlling an autonomous vehicle based at least in part on the estimated state.

8. The system of claim 7, wherein determining the weight comprises:

normalizing, as a normalized difference, the difference between the predicted measurement and the first measurement; and determining a division of 1 by the sum of 1 and a square of the normalized difference divided by a squared Cauchy threshold.

9. The system of claim 7, wherein:

determining the difference comprises applying a weight function to the difference, and applying the weight function is a separate operation from an update operation and operations of the Kalman filter.

10. The system of claim 9, wherein the weight function comprises a parameter and the operations further comprise:

determining, based at least in part on the sensor data, a condition; and determining the parameter based at least in part on the condition.

11. The system of claim 7, wherein modifying the Kalman filter comprises modifying a Kalman gain and modifying the Kalman filter comprises scaling the Kalman gain by the weight.

12. The system of claim 7, wherein:

modifying the Kalman filter comprises modifying a gain of the Kalman filter;

modifying the gain based at least in part on the weight, the weight having a first value below a lower threshold, results in the first measurement being ignored or influencing a covariance matrix of the Kalman filter less; or modifying the gain based at least in part on the weight, the weight having a second value that meets or exceeds an upper threshold, results in the first measurement being used to modify a covariance matrix of the Kalman filter.

13. The system of claim 7, wherein at least one of:

an update operation of the Kalman filter comprises updating a covariance matrix based at least in part on determining a first product of an observation matrix by a decomposition of a first uncertainty matrix associated with the estimated state and determining a second product of the first product by a transpose of the first product; or the operations further comprises a prediction operation of the Kalman filter, the prediction operation comprising determining a predicted covariance matrix based at least in part on determining a third product of a gain of the Kalman filter by a decomposition of a second uncertainty matrix associated with process noise and determining a fourth product of the third product by a transpose of the third product.

14. A non-transitory computer-readable medium storing processor-executable instructions that, when executed by one or more processors, cause the one or more processors to perform operations comprising:

receiving sensor data indicating a first measurement;

determining a difference between the first measurement and a predicted measurement;

determining a weight based at least in part on the difference;

modifying a Kalman filter based at least in part on the weight;

determining, by the Kalman filter and based at least in part on the modification and the first measurement, an estimated state; and controlling an autonomous vehicle based at least in part on the estimated state.

15. The non-transitory computer-readable medium of claim 14, wherein determining the weight comprises:

normalizing, as a normalized difference, the difference between the predicted measurement and the first measurement; and determining a division of 1 by the sum of 1 and a square of the normalized difference divided by a squared Cauchy threshold.

16. The non-transitory computer-readable medium of claim 15, wherein:

determining the weight comprises applying a weight function to the difference;

the weight function comprises a parameter; and the operations further comprise:

determining, based at least in part on the sensor data, a condition; and determining the parameter based at least in part on the condition.

17. The non-transitory computer-readable medium of claim 16, wherein the parameter includes a squared threshold.

18. The non-transitory computer-readable medium of claim 14, wherein modifying the Kalman filter comprises modifying a Kalman gain and modifying the Kalman filter comprises scaling the Kalman gain by the weight.

19. The non-transitory computer-readable medium of claim 14, wherein:

modifying the Kalman filter comprises modifying a gain of the Kalman filter;

modifying the gain based at least in part on the weight, the weight having a first value below a lower threshold, results in the first measurement being ignored or influencing a covariance matrix of the Kalman filter less; or modifying the gain based at least in part on the weight, the weight having a second value that meets or exceeds an upper threshold, results in the first measurement being used to modify a covariance matrix of the Kalman filter.

20. The non-transitory computer-readable medium of claim 14, wherein at least one of:

an update operation of the Kalman filter comprises updating a covariance matrix based at least in part on determining a first product of an observation matrix by a decomposition of a first uncertainty matrix associated with the estimated state and determining a second product of the first product by a transpose of the first product; or the operations further comprises a prediction operation of the Kalman filter, the prediction operation comprising determining a predicted covariance matrix based at least in part on determining a third product of a Kalman gain by a decomposition of a second uncertainty matrix associated with process noise and determining a fourth product of the third product by a transpose of the third product.

* * * * *